United States Patent
Arcangeli et al.

(10) Patent No.: US 10,193,299 B2
(45) Date of Patent: Jan. 29, 2019

(54) MODULATION SUPPRESSION IN FIBER LASERS AND ASSOCIATED DEVICES

(71) Applicant: Datalogic IP Tech S.R.L., Calderara di Reno, Bologna (IT)

(72) Inventors: Andrea Arcangeli, Pont Saint Martin (IT); Mihamed Hammouda, Pont Saint Martin (IT)

(73) Assignee: Datalogic IP Tech S.R.L., Bologna (IT)

( * ) Notice: Subject to any disclaimer, the term of this patent is extended or adjusted under 35 U.S.C. 154(b) by 0 days.

(21) Appl. No.: 15/473,924

(22) Filed: Mar. 30, 2017

(65) Prior Publication Data

US 2018/0287330 A1    Oct. 4, 2018

(51) Int. Cl.
  *H01S 3/117* (2006.01)
  *H01S 3/067* (2006.01)
  *H01S 3/16* (2006.01)

(52) U.S. Cl.
  CPC ............ *H01S 3/117* (2013.01); *H01S 3/0675* (2013.01); *H01S 3/169* (2013.01)

(58) Field of Classification Search
  CPC ... H01S 3/0675; H01S 3/094003; H01S 3/117
  See application file for complete search history.

(56) References Cited

U.S. PATENT DOCUMENTS 3,936,769 A    2/1976   de Wit et al.
4,378,536 A *  3/1983   Schwarzmann ....... H03H 7/255
                                                      327/308
4,630,275 A    12/1986  Rapoport
6,281,471 B1   4/2001   Smart
7,120,174 B2 * 10/2006  MacCormack ....... H01S 3/0675
                                                       372/13
7,224,707 B2   5/2007   Gendron
(Continued)

FOREIGN PATENT DOCUMENTS

CN    1953283 A     4/2007
CN    103259171 B   3/2015
(Continued)

OTHER PUBLICATIONS

Wang, Y., et al., "Actively Q-switched fiber lasers: Switching dynamics and nonlinear processes," Prog. Quantum Electron., vol. 31, No. 3-5, pp. 131-216, 2007.
(Continued)

*Primary Examiner* — Michael Carter
(74) *Attorney, Agent, or Firm* — Dentons US LLP

(57) ABSTRACT

A system and method for an active Q-switched fiber laser cavity may include a pump source for emitting a laser beam at a wavelength along an optical path including an active optical medium. A modulation device may be configured to introduce tunable losses into the optical path. The tunable losses may be achieved through modulation of the transmissivity of an optical element within the optical path, the modulation of said optical element being performed over (i) a first period of time in which a cavity Q curve increases from a first percentage value to a second percentage value of a maximum Q value and (ii) a second period of time in which the cavity Q curve increases from a third percentage value to a fourth percentage value of the maximum Q value. The cavity Q curve may non-linearly and smoothly transition between (i) the first and second percentage values and (ii) the third and fourth percentage values.

19 Claims, 6 Drawing Sheets

(56) References Cited

U.S. PATENT DOCUMENTS

| | | |
|---|---|---|
| 2005/0213617 A1 | 9/2005 | Gendron |
| 2005/0276286 A1 | 12/2005 | MacCormack et al. |
| 2015/0318660 A1* | 11/2015 | Oba .................... H01S 3/0675 372/6 |

FOREIGN PATENT DOCUMENTS

| | | |
|---|---|---|
| CN | 204666993 U | 9/2015 |
| KR | 20130095944 A | 8/2013 |

OTHER PUBLICATIONS

Zhen, L., "The split pulses from actively Q-switched fiber lasers," Laser Phys., vol. 23, No. 12, p. 125105, 2013.

Roy, P., et al., "Analysis and Optimization of a Q-Switched Erbium Doped Fiber Laser Working with a Short Rise Time Modulator," Opt. Fiber Technol., vol. 2, No. 3, pp. 235-240, 1996.

Escalante-Zarate, L., et al., "Smart Q-switching for single-pulse generation in an erbium-doped fiber laser.," Opt. Express, vol. 20, No. 4, pp. 4397-4402, 2012.

Lim, E-L., et al, "The Multipeak Phenomena and Nonlinear Effects in Q-Switched Fiber Lasers," IEEE Photonics Technol. Lett., vol. 23, No. 23, pp. 1763-1765, 2011.

Cuadrado-Laborde et al: "Q-switched all-fibre laser using a fibre-optic resonant acousto-optic modulator", Optics Communications, Elsevier, Amsterdam, NL. vol. 274, No. 2, Apr. 26, 2007 (Apr. 26, 2007), pp. 407-411.

European Extended Search Report corresponding to EP18164667.0, dated Jul. 27, 2018, 10 pages.

* cited by examiner ns, and typical pulse lengths of 50 ns-200 ns at pulse repetition rates of 10 kHz-200 kHz.

MODULATION SUPPRESSION IN FIBER LASERS AND ASSOCIATED DEVICES

FIELD OF THE INVENTION

The present invention relates to laser marking, and more specifically, to Q-switched fiber lasers used therefor.

BACKGROUND OF THE INVENTION

Lasers are used in a wide variety of systems, including laser marking systems that mark parts or products with markings or embossing. Such parts may include bolts, screws, product parts, or any other metal or nonmetal object, as understood in the art. To perform laser marking, lasers output high amounts of directed energy at particular wavelengths. Laser marking refers to a process of leaving marks on an object. Marking may include such methods as laser engraving, chemical/molecular alteration, charting, foaming, melting, and more. Laser marking can be applied in a number of industries, such as, but not limited to, metalworking, medical, automotive, electronics, wood, acrylic, leather, packaging, and more. Laser marking may be accomplished through a variety of technologies, such as FIBER, DPSS, and GAS lasers. One of ordinary skill in the art can appreciate that laser marking may be accomplished through other means.

For high-power lasers to be optimally used in commercial applications, there is a need to reduce signal structures typically observed in optical pulses emitted by high-power Q-switched all-fiber laser based on Yb-doped active fibers that cause laser output inefficiency. The optical pulses produced by this class of lasers are affected by amplitude modulation that can be detrimental for the overall laser efficiency. Strong amplitude modulations also introduce an unwanted variability in the optical output of different, yet nominally equivalent, laser systems. In fact, the characteristics of the modulation of the output is determined by a combination of different laser components, such as the active fiber absorption/emission properties, cavity length, cavity losses, and dynamics of the laser cavity Q-switching time.

All-fiber laser systems are often used in industrial applications with respect to their free-space counterpart because of a convenient alignment-free production process based on fusion splicing, robustness against environmental perturbations, and limited maintenance needs. However, cavity length of all-fiberized laser systems is typically longer than systems implementing free-space optical components. Therefore, laser cavities in the order of 4 m total length are typical for Q-switched lasers based on double-clad Yb-doped fibers pumped by state-of-the-art diode lasers emitting laser light in a 910-920 nm band. This laser cavity configuration is typically used in industrial laser systems for marking and machining applications. Cavity lengths of 4 m lead to photon round-trip times in the order of $T_{RT}$=40 ns, and typical pulse lengths of 50 ns-200 ns at pulse repetition rates of 10 kHz-200 kHz.

The fingerprint of the cavity length is imprinted in laser output in the form of intensity modulation with frequency $\omega_{RT}=2\pi/T_{RT}$. The amplitude of the modulation (i) depends on the cavity parameters, (ii) can be comparable to the pulse amplitude itself, and (iii) may lead to a complete splitting of the laser pulses under certain conditions. A strong modulation of laser output pulses has a direct impact on industrial applications, such as marking or engraving. While the total energy of the pulses is typically only slightly affected by this phenomenon, except when strong nonlinearities are triggered as further described herein, the pulse peak power may substantially change when a strong amplitude modulation is superimposed to the pulse envelope. If a maximum of the modulation corresponds to the center of the pulse, then the peak power is increased, otherwise the peak power is decreased. If the modulation is particularly strong, or if the laser is a operated close to the power-density threshold of non-linear effects, such as Raman scattering, stimulated Brillouin scattering, self-phase modulation, etc., a fluctuation of the peak power may substantially change the spectral characteristics of the laser output and reduce the overall efficiency of the laser.

To avoid the shortcomings of existing laser marking systems with regard to amplitude modulation being superimposed on laser pulses, conservative solutions are typically adopted. The most common strategy is to limit the total cavity gain by, for example, limited pumping, short active fiber absorption length, and high cavity losses (e.g., increase of the end-cavity transmissivity). These conservative methods reduce the amplitude of the pulse modulation, but also the total amount of the emitted energy-per-pulse.

In high power, compact systems, such as those used for laser marking, the conservative solutions described above have a negative impact on the final application. Hence, there is a need to solve the problem of inefficiencies of laser marking lasers due to amplitude modulation on laser pulses. Moreover, there is a need to reduce variability of output parameters of fiber lasers and reduce non-linear optical effects in fiber laser systems.

BRIEF SUMMARY OF THE INVENTION

To produce a high-power fiber laser system that has improved efficiency and reduced variability, a process for smoothening a transition from a low level to a high level of a laser cavity quality factor (Q) may be provided.

One embodiment of a system for an actively Q-switched fiber laser cavity may include an optical resonator (cavity). A pump source for emitting a laser pump beam at a wavelength may be disposed along an optical path. An active optical element, such as an optical gain medium, may be disposed in the optical cavity along the optical path. A modulation device may be configured to introduce tunable losses into the optical path. The tunable losses may modulate the cavity Q, The modulation of the cavity Q may be performed over (i) a first period of time in which a cavity Q curve increases from a first percentage value to a second percentage value of a maximum Q value and (ii) a second period of time in which the cavity Q curve increases from a third percentage value to a fourth percentage value of the maximum Q value. The cavity Q curve may non-linearly and smoothly transition between (i) the first and second percentage values and (ii) the third and fourth percentage values.

One embodiment of a process for suppressing amplitude modulation in an actively Q-switched fiber laser cavity may include emitting a pump laser beam at a wavelength into an optical path. The pump laser beam may be absorbed by an optically active medium. The active medium may be placed in an optical resonator. The Q of the optical resonator may be modulated, thereby introducing tunable losses. The modulation of the cavity Q may be performed over a first period of time in which a cavity Q curve increases from a first percentage value to a second percentage value of a maximum Q value and over a second period of time in which the cavity Q curve increases from a third percentage value to a fourth percentage value of the maximum Q value. The cavity Q curve may non-linearly and smoothly transition between (i) the first and second percentage values and (ii) the third and fourth percentage values. The modulated first filtered laser beam may be reflected at a second filtered wavelength to output a second filtered laser beam.

One embodiment of a process for suppressing amplitude modulation in an actively Q-switched fiber laser cavity may include first low-pass filtering a square wave by a first-order low-pass filter to form a first low-pass filtered signal. A smooth rise wave may be created in the first low-pass filtered signal by filtering the first low-pass filtered signal by a second-order low-pass filter to form a second low-pass filtered signal. The second low-pass filtered signal may be applied to a modulator within the optical cavity of the actively Q-switched fiber laser to introduce tunable losses into the actively Q-switched fiber laser cavity.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE INVENTION

First Mode of Embodiment

1. Summary of the System

Figure 1B:
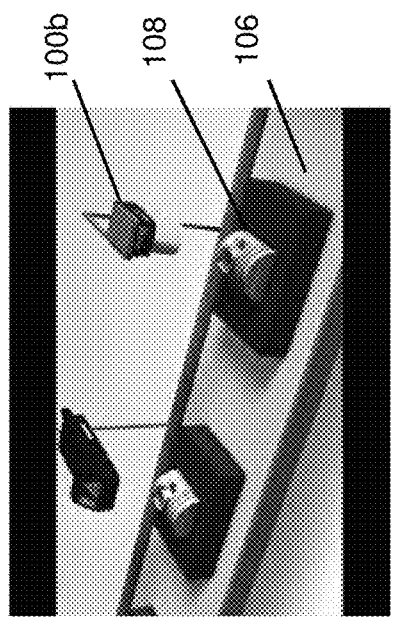
FIG. 1B is an illustration of an alternative laser marking system configured in a fixed position over a conveyer, for example, on which a part may be moved so that a laser beam (not shown) output from the laser marking system may be used to mark the part.
Figure 1A:
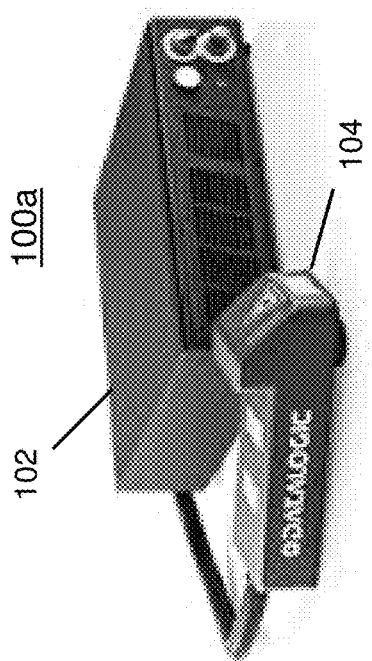
FIG. 1A is an illustration of a laser marking system in which improved efficiencies using the principles described herein may be utilized.

Referring now to FIG. 1A, an illustration of a laser marking system 100a in which improved efficiencies using the principles described herein is shown. The laser marking system 100a may include (i) a power and controller device 102 and (ii) a hand-held or fixture mountable laser head 104 that is configured to output a laser beam that marks objects. Marking of objects may be used for military, commercial, and consumer purposes, where the objects may vary from nuts and bolts to airplane components and any other part of nearly any material that may be used to produce products or are final products themselves. In one embodiment, the laser marking system 100a marks on metal to perform engraving.

Referring to FIG. 1B, an illustration of an alternative laser marking system 100b configured in a fixed position over a conveyer 106, for example, on which an object 108 may be moved so that a laser beam (not shown) output from the laser marking system 100b may be used to mark the object 108 is shown. It should be understood that the object 108 may be any shape and size, and the laser marking systems 100a and 100b may have alternative configurations (e.g., disposed on an end of a robot arm).

In one embodiment, the laser marking systems 100a and 100b include a high power Q-switched fiber laser based on Ytterbium-doped active fibers. Optical pulses produced by Q-switched fiber class of lasers are affected by amplitude modulation that may be detrimental to overall laser efficiency. Amplitude modulations may also introduce an unwanted variability in the optical output of equivalent lasers, as understood by one of ordinary skill in the art. Addressing amplitude modulation may sacrifice quality of the engraving 104 due to reduced pulse rate.

One of ordinary skill in the art will appreciate that metal is one of many other materials, including stone, glass, plastics, and natural materials, such as wood, that may be engraved. One of ordinary skill in the art will also appreciate that the present embodiment of the laser marking systems 100a and 100b may work in a substantially similar manner when marking on any markable material.

Figure 2B:
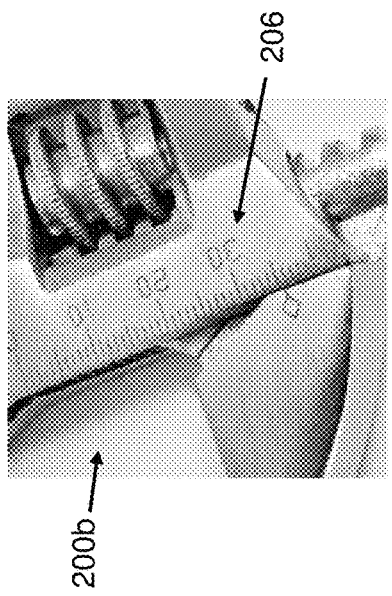
FIGS. 2A and 2B are illustrative parts, respectively a screw and a wrench, on which laser markings have been applied.
Figure 2A:
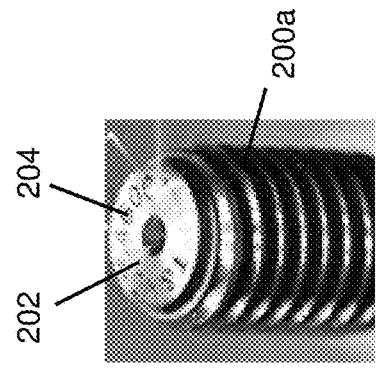

Referring to FIGS. 2A and 2B, illustrative objects 200a and 200b, respectively a screw and a wrench, on which laser markings have been applied are shown. The object 200a, in this case a bolt, includes a surface 202 on which markings or engravings 204 may be created by a laser beam of a laser marking system, such as those shown in FIGS. 1A and 1B. It should be understood that the laser marking systems may also be configured to create an embossing by etching away material to the outside of an area, such as alphanumeric or logo shapes. The object 200b, in this case a wrench, is also shown to include markings that represent a ruler, for the use of the object 200b, as understood in the art.

Figure 3A:
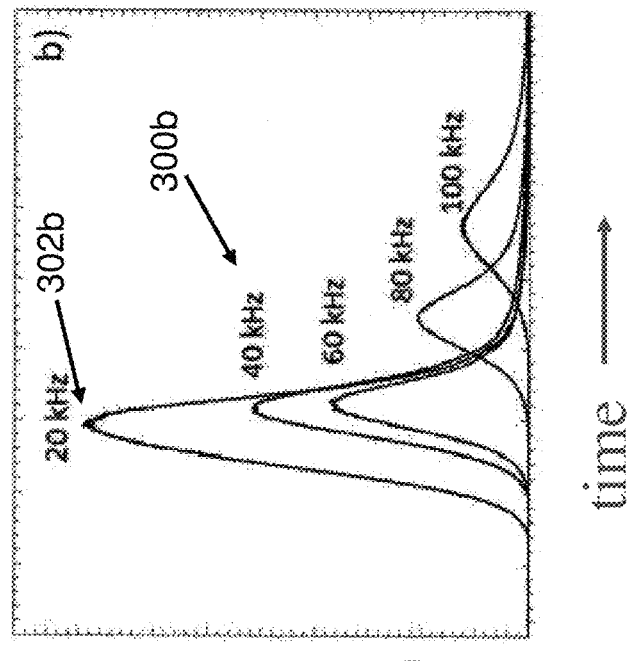
FIG. 3A is a graph of illustrative output laser pulses emitted from a Q-switched fiber laser operating at a pulse repetition rate.

Referring now to FIG. 3A, a graph of illustrative output laser pulses 300a emitted from a Q-switched fiber laser operating at a pulse repetition rate is shown. The output laser pulses 300a are produced by a fast driving a Q-switched modulator, and are representative of Q-switching dynamics of a laser cavity. The pulse repetition rate of the output laser pulses 300a range from 20 kHz to 100 kHz and pulsed every 20 kHz. As shown, each of the laser pulses 300a show evidence of amplitude modulation at respective peaks. For example, at peak 302a, amplitude modulation causes multiple peaks that cause power in efficiency at the peak 302a. The amplitude modulations are as a result of fast driving a Q-switching modulator. Again, the amplitude modulations may negatively impact marking or engraving due to spectral inefficiencies.

More specifically, the laser pulses 300a result from a fast Q-switching modulator that includes a rise time that is short compared to a round-trip time of a laser cavity. Pulse modulation is evident, especially at low frequencies, where gain is higher due to a longer pumping time between pulses.

Figure 3B:
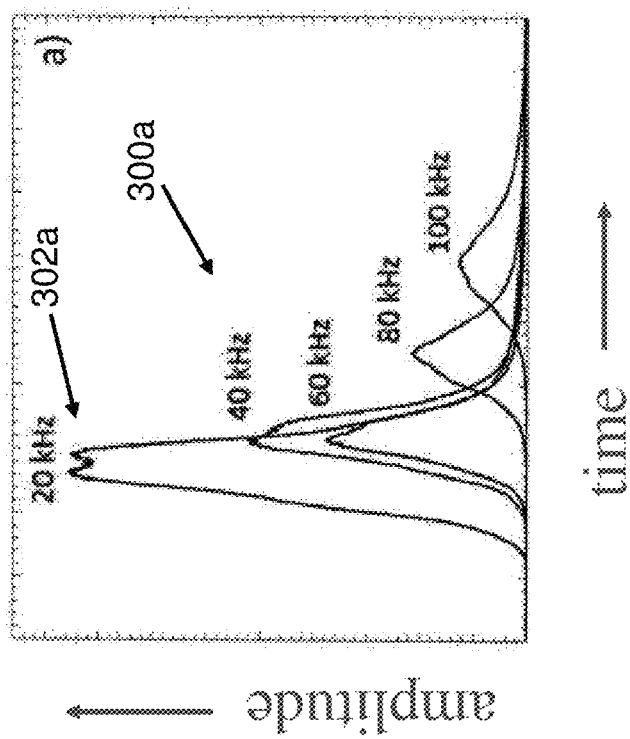
FIG. 3B is a graph of illustrative output laser pulses emitted from a Q-switched fiber laser operating at the same pulse repetition rate of FIG. 3A.

Referring now to FIG. 3B, a graph of illustrative output laser pulses 300b emitted from a Q-switched fiber laser operating at the same pulse repetition rate of FIG. 3A is shown. The output laser pulses 300b are shown to be smooth pulse shapes that are nearly Gaussian with substantially no pulse or amplitude modulation, while maintaining substantially the total energy-per-pulse constant. The output laser pulses 300b may be achieved through smooth driving of an optical component, such as an acousto-optic modulator (AOM), within the laser cavity, as described hereinbelow. Modulation of a cavity Q may ultimately enable higher gain, higher efficiencies by suppression of nonlinear effects, and a wider range of repetition rates with limited variability of laser output parameters, as represented by the output laser pulses 300b.

Figure 4:
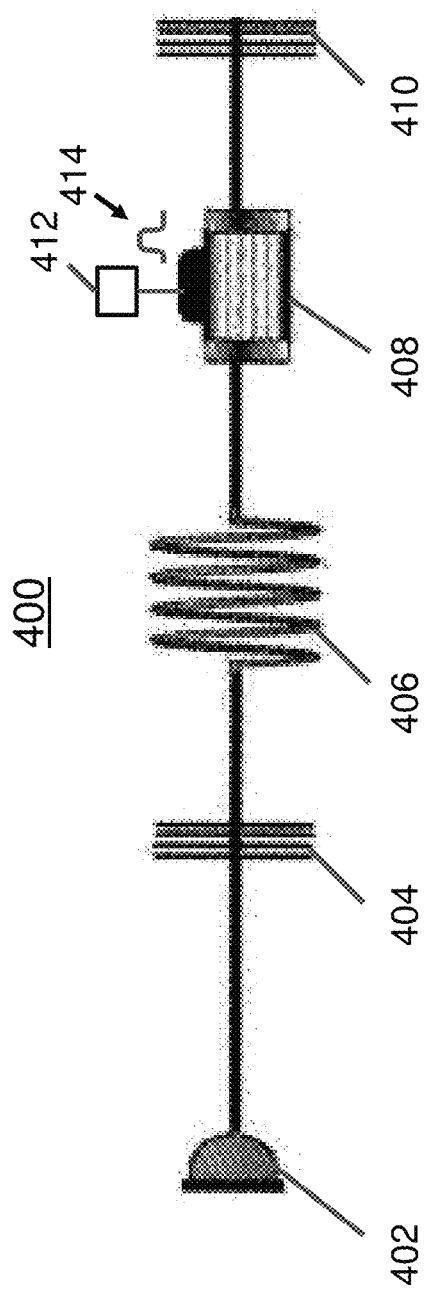
FIG. 4 is an illustration of an illustrative schematic representation a fiber Q-switched laser cavity.

Referring now to FIG. 4, an illustration of an illustrative schematic representation a fiber Q-switched laser cavity 400 is shown. The laser cavity 400 may include a pump diode 402, a first reflective component 404, an optically active (gain) medium 406, a modulator 408, and a second reflective component 410 as part of an optical path. It should be understood that alternative component configurations, such as different optical devices, may be used to represent a laser cavity.

Actively Q-switching cavities may include optical resonators that employ the modulator 408 that may be actively controlled to introduce time and amplitude tunable losses. In one embodiment, the modulator 408 of the laser cavity 400 is an acousto-optic modulator. In another embodiment, the modulator 408 of the laser cavity 400 may be an electro-optic modulator (EOM). The modulator 408 may periodically interrupt the optical path of the laser cavity 400 by acting as a switching element.

In one embodiment, the first reflective component 404 and the second reflective component 410 may include reflective fiber Bragg gratings (FBGs) that in part operate as bandpass filters, as understood in the art, where a laser may be partly transmitted. The optically active medium 406 may comprise an Ytterbium-doped active fiber. The second reflective component 410 may be configured to act as an output coupler for the laser cavity 400.

In operation, the pump diode 402 may emit a laser beam at a wavelength along the optical path. In one embodiment, the wavelength may be in a range of approximately 910 nm to approximately 920 nm. The first reflective component 404 may reflect a laser beam at a first filtered wavelength. In one embodiment, the first filtered wavelength is 1064 nm. The modulator 408 may act as a Q-switching device, as understood in the art. The second reflective component 410 may reflect a laser beam at a second filtered wavelength. In one embodiment, the second filtered wavelength is also 1064 nm. Alternative wavelengths may be utilized, as well.

As understood in the art, AOMs are radiofrequency (RF) driven devices, typically with a fiberized port aligned to a zeroth ($0^{th}$) or first ($1^{st}$) diffraction order. In one embodiment, coupling occurs at the first order of diffraction and device transmission is proportional to an amount of driving RF power. An RF generator may be driven by a modulation voltage, and the amount of RF power emitted by the RF generator (hereafter RF driver) may be proportional to the modulation voltage $V_{mod}$. In other words, the modulator 408 may be used to adjust the transmitted signal (light) inside the optical resonator. Assuming a linear dependence between the AOM transmission and cavity Q, where cavity Q is linearly proportional to a voltage modulation $V_{mod}$. In such circumstances, a direct control of the cavity Q may be achieved by tailoring or shaping the modulation voltage. To tailor the modulation voltage, a circuit 412, such as a filtering circuit (see FIG. 5) may be in electrical communication with the AOM 408 to generate an input signal 414, such as smoothened square wave pulses, as further described with regard to FIGS. 5 and 6.

In an embodiment, tailoring the modulation voltage may be accomplished by direct waveform synthesis by an arbitrary waveform generator (AWG). In another embodiment, tailoring the modulation voltage may be accomplished by filtering and reshaping of standard waveforms, such as square wave pulses, that are readily obtained with digital electronic circuits. One of ordinary skill in the art will appreciate that regardless of how the modulation voltage may be tailored, a smooth modulation voltage time behavior may be achieved with a positive second derivative for t<t* and a sharper rise at t>t* (see FIG. 7), thereby keeping total rise time relatively short and approximately within a few photons of a round-trip time of the laser cavity 400.

The gain properties of an embodiment of the laser cavity 400 are given, among other factors, by the amount of energy stored in the optically active medium 406 during a pumping phase when the cavity Q is set to a low level. Emission of a laser pulse may occur by switching the cavity Q to a high level. As the pumping phase time increases, higher amounts of energy may be stored in the optically active medium 406, thereby resulting in higher energy being released for each output pulse and a decrease in pulse duration.

Figure 5:
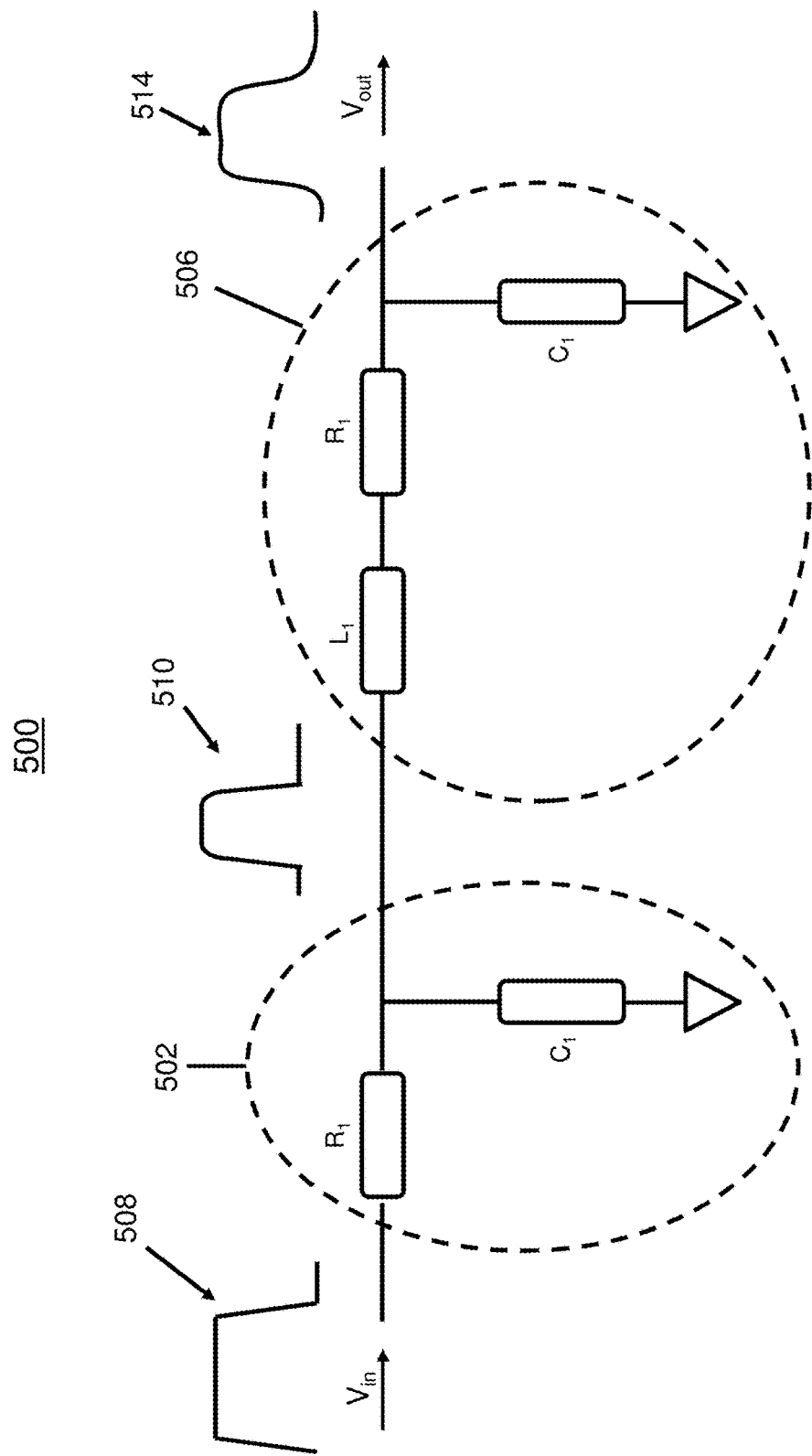
FIG. 5, a schematic of an illustrative filtering circuit that may be used to drive the AOM of FIG. 4.

Referring now to FIG. 5, a schematic of an illustrative filtering circuit 500 that may be used to drive the AOM 408 of FIG. 4 is shown. The filtering circuit 500 may include a first low-pass filter circuit 502, and a second low-pass filter circuit 506. In one embodiment, the first low-pass filter circuit 502 is a low-pass resistor-capacitor circuit and the second low-pass filter circuit 506 is a low-pass inductor-resistor-capacitor circuit. As shown, the first low-pass filter circuit 502 is a first order low-pass filter, and the second low-pass filter is a second order low-pass filter. As one of ordinary skill in the art will appreciate, a number of alternative configurations that function as low-pass filters may be utilized.

In operation, the filtering circuit 500 may receive an input square wave 508 that is low-pass filtered by the first low-pass filter circuit 502 that outputs a first filtered square wave 510 that has rounded upper corners due to removing high-frequency components from the input square wave 508. The filtered square wave 510 may be filtered by the second low-pass filter 506 to produce a second filtered square wave 514 that may be output from the filtering circuit 500 and applied as an input signal to the AOM. By filtering square waves, integration in standard systems employing digital electronic components may be easier as square wave signals are generally available in digital systems.

By shaping of the input signal, a smooth signal rise of the cavity Q of the laser cavity at t<t* (see FIG. 7) may result. It should be understood that alternatively shaped signals may be utilized to produce a shaped input signal to the AOM to control the Q of the laser cavity. An alternative circuit may perform the same or similar filtering functionality utilizing operational amplifier(s) configured to perform high-order active filtering.

Figure 6:
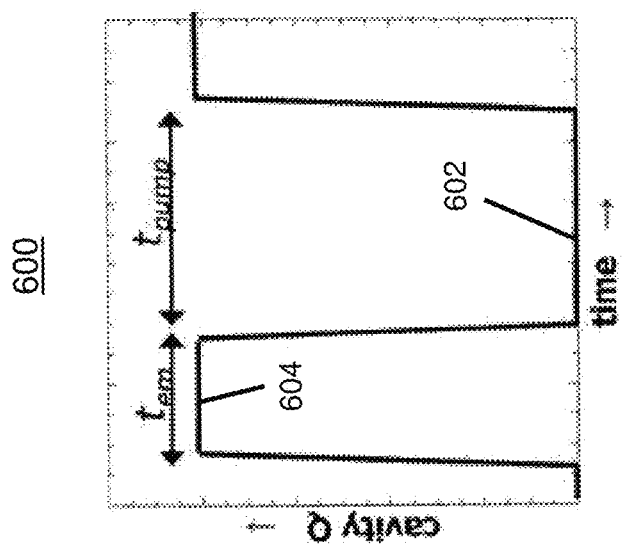
FIG. 6 is a graph showing an emission pumping cycle.

Referring now to FIG. 6, a graph showing an emission-pumping cycle 600 is shown. The emission pumping cycle 600 may be the emission pumping cycle of a Q-switched laser cavity, as described herein. Energy may be stored in the optically active medium 406 of FIG. 4 during a low Q time $t_{pump}$ 602. The gain or energy may also be released during an emission time $t_{em}$ 604 when the cavity Q is increased. The longer the pumping phase time $t_{pump}$, the higher the energy stored in the active medium, the higher the energy released for each output pulse, and the shorter the pulse duration.

Figure 7:
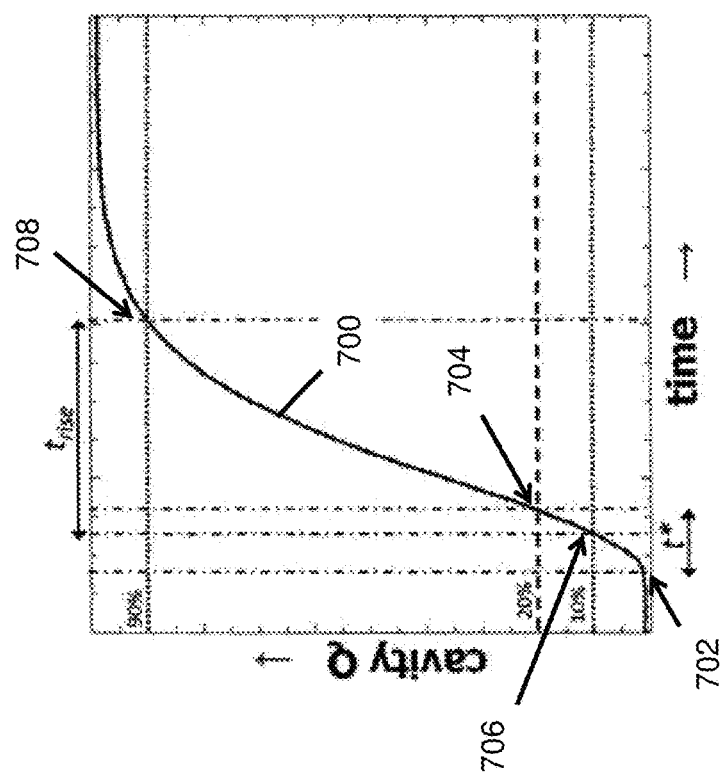
FIG. 7 is a graph of an illustrative cavity Q curve showing a smooth increase over time.

Referring now to FIG. 7, a graph of an illustrative cavity Q curve 700 showing a smooth increase over time is shown. The cavity Q curve 700 represents a smooth transition from a low level to a high level of the laser cavity quality factor (Q) in high power fiber lasers. In particular, the smooth transition may include increasing the cavity Q from a first percentage value 702 to a second percentage value 704 of a maximum attainable Q over a time t*, which may be substantially similar to a round-trip time of the laser cavity 400 of FIG. 4. At a time substantially close to the end of t*, the cavity Q may be increased at a faster rate defined by a period of time in which the cavity Q increases from a third percentage value 706 to a fourth percentage value 708 of the maximum attainable Q, thus keeping a total Q rise time still comparable to the round-trip time of the laser cavity 400 of FIG. 4. The total Q rise time, as a result, may not be limiting a pulse repetition rate, which may ultimately be given by an ability to accumulate energy during the low-Q phase of a Q-switched operation cycle.

In one embodiment, the first percentage value 702 is zero or approximately zero, the second percentage value 704 is approximately 20%, the third percentage value 706 is approximately 10%, and the fourth percentage value 708 is approximately 90%. By keeping the total cavity Q rise time comparable to the round-trip time of the laser cavity 400, amplitude modulation may be suppressed without sacrificing pulse duration and pulse rate. The cavity Q curve 700 may be nonlinear and smoothly transition between (i) the first and second percentage values and (ii) the third and fourth percentage values. Additionally, the smooth transitions of the cavity Q curve 700 may be parabolic.

The foregoing method descriptions and the process flow diagrams are provided merely as illustrative examples and are not intended to require or imply that the steps of the various embodiments must be performed in the order presented. As will be appreciated by one of skill in the art, the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations may be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to and/or in communication with another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The previous description is of a preferred embodiment for implementing the invention, and the scope of the invention should not necessarily be limited by this description. The scope of the present invention is instead defined by the following claims.

What is claimed:

1. A system for an actively Q-switched fiber laser cavity, said system comprising:
   an optical resonator (cavity);
   a pump source for emitting a laser beam at a wavelength along an optical path;
   an active optical medium disposed in the optical cavity along the optical path;
   an electronic circuit configured to:
      first low-pass filter a square wave to form a first low-pass filtered signal; and
      second low-pass filter the first low-pass filtered signal to create a smooth rise wave in the first low-pass filtered signal to form a second low-pass filtered signal, the second low-pass filtered signal being an input signal to control the modulation of the laser beam; and
   a modulation device in electrical communication with said electronic circuit to receive the second low-pass filtered signal as an input signal, and configured to introduce tunable losses into the optical path, the tunable losses inducing a modulation as a function of the second low-pass filtered signal of the cavity Q, the modulation of the cavity Q being performed over (i) a first period of time in which a cavity Q curve increases from a first percentage value to a second percentage value of a maximum Q value and (ii) a second period of time in which the cavity Q curve increases from a third percentage value to a fourth percentage value of the maximum Q value, the cavity Q curve non-linearly and smoothly transitioning between (i) the first and second percentage values and (ii) the third and fourth percentage values.

2. The system according to claim 1, wherein the first percentage value is approximately zero percent, wherein the second percent value is approximately twenty percent, wherein the third percent value is approximately ten percent, and wherein the fourth percentage value is approximately ninety percent.

3. The system according to claim 1, wherein the modulation device is a radiofrequency (RF) driven device.

4. The system according to claim 3, wherein the modulation device is an acousto-optic modulator.

5. The system according to claim 4, wherein said circuit is configured to apply an input signal into said modulation device to cause said modulation device to modulate the laser beam.

6. The system according to claim 4, wherein said circuit is configured to shape the input signal, and including:
a first low-pass filter circuit; and
a second low-pass filter circuit serially connected to the output of the first low-pass filter circuit.

7. The system according to claim 1, comprising a first highly reflective Fiber Bragg Grating (FBG) in the optical path interposed between the pump source and the active optical medium, the first FBG configured to reflect the laser at a first filtered wavelength.

8. The system according to claim 7, further comprising a second partly reflective Fiber Bragg Grating (FBG) optically coupled to the output of the modulation device, the second FBG configured to partly transmit the laser at the same first filtered wavelength, the second FBG further configured to be an output coupler of the laser cavity.

9. The system according to claim 1, wherein the active optical medium is an Ytterbium-doped active fiber.

10. The system according to claim 1, wherein the first period of time is approximately the same as a laser cavity round-trip time.

11. The system according to claim 1, wherein the second period of time is approximately the same as a laser cavity round-trip time.

12. A method for suppressing amplitude modulation in an actively Q-switched fiber laser cavity, the method comprising:
emitting a pump laser beam at a wavelength into an optical path;
first low-pass filtering a square wave to form a first low-pass filtered signal;
second low-pass filtering the first low-pass filtered signal to create a smooth rise wave in the first low-pass filtered signal to form a second low-pass filtered signal, the second low-pass filtered signal being an input signal to control the modulation of the laser beam;
modulating the transmissivity of an optical component in the optical path as a function of the second low-pass filtered signal to cause tunable losses, the modulation of the transmissivity of said optical component being performed over a first period of time during which a cavity Q curve increases from a first percentage value to a second percentage value of a maximum Q value and over a second period of time in which the cavity Q curve increases from a third percentage value to a fourth percentage value of the maximum Q value, the cavity Q curve non-linearly and smoothly transitioning between (i) the first and second percentage values and (ii) the third and fourth percentage values, thereby producing a modulated first filtered laser beam; and
reflecting the modulated first filtered laser beam at a second filtered wavelength to output a second filtered laser beam.

13. The method according to claim 12, wherein the first percentage value is approximately zero percent, wherein the second percent value is approximately twenty percent, wherein the third percent value is approximately ten percent, and wherein the fourth percentage value is approximately ninety percent.

14. The method according to claim 12, wherein the first period of time is approximately the same as a laser cavity round-trip time.

15. The method according to claim 14, wherein the second period of time is approximately the same as the laser cavity round-trip time.

16. A method for suppressing amplitude modulation in an actively Q-switched fiber laser cavity, said method comprising:
first low-pass filtering a square wave to form a first low-pass filtered signal;
creating a smooth rise wave in the first low-pass filtered signal to form a second low-pass filtered signal; and
applying the second low-pass filtered signal to a modulator within an optical path of the actively Q-switched fiber laser cavity to introduce tunable losses into the actively Q-switched fiber laser cavity.

17. The method according to claim 16, further comprising emitting a laser beam at a wavelength along an optical path within the Q-switched fiber laser cavity.

18. The method according to claim 16, wherein introducing tunable losses into the active Q-switched fiber laser cavity includes modulating the cavity Q by introducing tunable losses, the modulation of the cavity Q being performed over a first period of time in which a cavity Q curve increases from a first percentage value to a second percentage value of a maximum Q value and over a second period of time in which the cavity Q curve increases from a third percentage value to a fourth percentage value of the maximum Q value, the cavity Q curve non-linearly and smoothly transitioning between (i) the first and second percentage values and (ii) the third and fourth percentage values in response to the third low-pass filtered signal being applied to the modulator.

19. The method according to claim 18, wherein the first period of time is approximately the same as a laser cavity round-trip time.

* * * * *